(12) United States Patent
Clout et al.

(10) Patent No.: US 10,085,318 B2
(45) Date of Patent: Sep. 25, 2018

(54) LIGHTING UNIT WITH MULTIPLE LIGHT SOURCES TO EMIT FUNCTIONAL LIGHT OR DYNAMIC LIGHTING EFFECT

(71) Applicant: PHILIPS LIGHTING HOLDING B.V., Eindhoven (NL)

(72) Inventors: Ramon Antoine Wiro Clout, Eindhoven (NL); Dzmitry Viktorovich Aliakseyeu, Eindhoven (NL); Bartel Marinus Van De Sluis, Eindhoven (NL); Tim Dekker, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/529,496

(22) PCT Filed: Nov. 26, 2015

(86) PCT No.: PCT/IB2015/059141
§ 371 (c)(1),
(2) Date: May 24, 2017

(87) PCT Pub. No.: WO2016/088000
PCT Pub. Date: Jun. 9, 2016

(65) Prior Publication Data
US 2017/0265265 A1  Sep. 14, 2017

Related U.S. Application Data

(60) Provisional application No. 62/086,299, filed on Dec. 2, 2014.

(51) Int. Cl.
*F21V 35/00* (2006.01)
*H05B 37/02* (2006.01)
(Continued)

(52) U.S. Cl.
CPC ........ *H05B 33/0857* (2013.01); *F21S 10/043* (2013.01); *F21V 3/00* (2013.01);
(Continued)

(58) Field of Classification Search
CPC .............. F21Y 2115/10; F21Y 2113/10; F21Y 2113/00; F21S 10/04; F21S 6/001;
(Continued)

(56) References Cited

U.S. PATENT DOCUMENTS 5,924,784 A * 7/1999 Chliwnyj ................. F21S 9/02
307/64
6,016,038 A  1/2000 Mueller et al.
(Continued)

FOREIGN PATENT DOCUMENTS

DE  102011000657 A1  8/2012
WO  WO2002061330 A2  8/2002
WO  WO2014120818 A1  8/2014

*Primary Examiner* — Vibol Tan
(74) *Attorney, Agent, or Firm* — Akarsh P. Belagodu (57) ABSTRACT

Lighting units, lighting unit controls and lighting control methods are described herein. In various embodiments, a lighting unit (100, 500, 600, 700) may include a first light source (106, 06, 606, 706) that is adjustable to emit first light having a range of levels of a particular lighting property, such as brightness, saturation or hue. The lighting unit may further include a second light source (108, 508, 608, 708) that automatically, and independently of the first light source, transitions between a plurality of states in which the second light source emits second light at a plurality of levels of the particular lighting property that collectively form a dynamic effect.

7 Claims, 7 Drawing Sheets

(51) Int. Cl.
*H05B 33/08* (2006.01)
*F21S 10/04* (2006.01)
*F21V 21/00* (2006.01)
*F21V 3/00* (2015.01)
*F21S 10/00* (2006.01)
*F21K 9/61* (2016.01)

(52) U.S. Cl.
CPC .............. *F21V 21/00* (2013.01); *F21V 35/00* (2013.01); *H05B 33/0809* (2013.01); *F21K 9/61* (2016.08); *F21S 10/00* (2013.01)

(58) Field of Classification Search
CPC ........ F21S 10/046; F21S 10/043; F21S 10/00; F21S 10/005; F21S 6/002; F21S 8/04; F21S 9/00; H05B 39/09; H05B 33/0845; H05B 37/0218; H05B 33/0857; H05B 33/0809; H05B 37/02; H05B 33/0824; H05B 33/0842; F21V 29/503; Y10S 362/81; Y10S 362/80; Y10S 362/806; F21K 9/61
See application file for complete search history.

(56) References Cited

U.S. PATENT DOCUMENTS

| | | | |
|---|---|---|---|
| 6,211,626 B1 | 4/2001 | Lys et al. | |
| 7,066,637 B2* | 6/2006 | Nozawa | F21S 10/04 362/161 |
| 7,350,720 B2* | 4/2008 | Jaworski | A61L 9/037 239/34 |
| 8,408,746 B1* | 4/2013 | Lauer | F21S 8/065 362/271 |
| 9,644,807 B1* | 5/2017 | Harris | F21S 10/04 |
| 9,683,713 B2* | 6/2017 | Chartrand | F21S 6/001 |
| 9,719,643 B1* | 8/2017 | Cheng | F21S 10/043 |
| 9,739,432 B2* | 8/2017 | Li | F21S 10/04 |
| 9,756,707 B2* | 9/2017 | Patton | H05B 37/0272 |
| 9,810,388 B1* | 11/2017 | Li | F21S 10/046 |
| 9,810,405 B2* | 11/2017 | Yang | F21V 14/085 |
| 2003/0161145 A1 | 8/2003 | Liu et al. | |
| 2005/0259416 A1 | 11/2005 | Guan et al. | |
| 2011/0127914 A1 | 6/2011 | Patton et al. | |
| 2011/0279034 A1* | 11/2011 | Lucas | F21V 23/0464 315/92 |
| 2012/0049765 A1 | 3/2012 | Lu et al. | |

* cited by examiner

LIGHTING UNIT WITH MULTIPLE LIGHT SOURCES TO EMIT FUNCTIONAL LIGHT OR DYNAMIC LIGHTING EFFECT

CROSS-REFERENCE TO PRIOR APPLICATIONS

This application is the U.S. National Phase application under 35 U.S.C. § 371 of International Application No. PCT/IB2015/059141, filed on Nov. 26, 2015, which claims the benefit of U.S. Patent Application No. 62/086,299, filed on Dec. 2, 2014. These applications are hereby incorporated by reference herein.

TECHNICAL FIELD

The present invention is directed generally to lighting control. More particularly, various inventive methods and apparatus disclosed herein relate to lighting units, lighting unit controls, and lighting control methods for independently controlling two or more light sources of a lighting unit to alternative between providing functional light and a dynamic lighting effect.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Dynamic lighting effects may be used to mimic various lighting phenomena, such as candlelight flicker or ripples of water. Some dynamic lighting effects may most effectively mimic lighting phenomena when the light that forms them is emitted with particular lighting properties. For example, candlelight flicker is best mimicked at relatively low levels of brightness. While a chandelier of LED-based lighting units may be aesthetically appealing when those lights mimic candles, it may also be desirable on occasion to use the chandelier to provide functional lighting, which is typically much brighter than candlelight. LED controllers that are capable of handling low root mean square ("RMS") voltages can be complicated and/or expensive, and may not be suitable for a plurality of relatively high-powered LED bulbs, especially when the high-powered LED light bulbs are not necessary for low level dynamic effects such as mimicking candlelight. Thus, there is a need in the art to provide a lighting unit that is both capable of creating dynamic lighting effects such as candlelight and that is also capable of providing functional lighting, without the need for complicated and/or expensive circuitry.

SUMMARY

The present disclosure is directed to inventive methods and apparatus for creating dynamic lighting effects such as candlelight, as well as providing functional lighting, without the need for complicated and/or expensive circuitry. For example, a lighting unit may include a first higher powered light source for creating functional lighting and a second light source for creating a dynamic lighting effect, such as a candlelight flicker. These separate light sources may be operated independently of each other. In some embodiments, the second light source may create the dynamic lighting effect regardless of what the first light source is doing. In some embodiments, the dynamic lighting effect emitted by the second light source may be created at brightness levels that are only visible when the first light source is energized to emit light below a particular brightness level.

Generally, in one aspect, a lighting unit may include: a housing; a first light source, contained within the housing, that is adjustable to emit first light at a range of brightness levels; a second light source, contained within the housing; and a flicker modulator to automatically transition second light source between a plurality of states in which the second light source emits second light at a plurality of brightness levels that collectively form a dynamic effect, wherein the flicker modulator transitions the second light source between the plurality of states independently of how the first light source is adjusted.

In various embodiments, the first light source may be dimmable. In various versions, the first light source stops emitting the first light in response to being dimmed below a floor brightness level. In various embodiments, the first and/or second light sources may include one or more light-emitting diodes.

In various embodiments, the housing forms a dome-shaped light guide, and at least some of the first light is emitted along a wall of the dome-shaped light guide to be guided generally perpendicular to a surface of the housing.

In various embodiments, the first and second light sources may be powered by an AC power source. In such case, the lighting unit may include an AC/DC convertor to convert AC power from the AC power source to a constant voltage for the second light source. For example, the AC/DC convertor may convert AC power from AC mains to a constant voltage for the flicker modulator. In various embodiments, the first and second light sources are independently adjustable to alter a hue, saturation or color temperature of the first and second lights, respectively. In various embodiments, the second light source responds to a request to emit a particular lighting scene in different ways depending on a brightness level of the first light.

In another aspect, a lighting unit controller may include: a first light-emitting diode LED driver to energize a first LED to emit first light having an amount of a particular lighting property that is related to an amount of power received by the first LED driver; and a second LED driver to automatically energize a second LED to emit second light at a plurality of levels of the particular lighting property to form a dynamic lighting effect, wherein the second LED driver operates independently to the amount of power received by the first LED driver. In various embodiments, the particular lighting property may be hue, brightness, or saturation. In various embodiments, the dynamic lighting effect mimics flicker of candlelight. In various embodiments, the second LED driver may be a flicker modulator.

In another aspect, a lighting control method may include: adjusting a first light source of a lighting unit to emit first light at one of a range of brightness levels; and automatically transitioning a second light source of the lighting unit between a plurality of states in which the second light source emits second light at a plurality of brightness levels that collectively form a dynamic effect. The second light may be visible while the first light source is adjusted to emit light below a particular brightness level. The second light may be invisible while the first light source is adjusted to emit light above the particular brightness level. In various embodiments, the method may further include: receiving a request to emit a particular lighting scene; energizing the second light source to emit light having a first property when the first light has a first level of brightness; and energizing the second light source to emit light having a second property that is different than the first property when the first light has a second level of brightness.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyroluminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Dynamic lighting effects may be used to mimic various lighting phenomena, such as candlelight flicker or ripples of water. However, lighting units that create these effects may also need to be able to provide functional lighting (e.g., lighting that is bright enough in which to read). LED controllers that are capable of handling low RMS voltages can to be complicated and expensive, and may not be suitable for a plurality of relatively high-powered LED bulbs, especially when the high-powered LED light bulbs are not necessary for low level dynamic effects such as mimicking candlelight. Accordingly, Applicants have recognized and appreciated that it would be beneficial to provide a lighting unit that is both capable of creating dynamic lighting effects such as candlelight and that is also capable of providing functional lighting, without the need for complicated and/or expensive circuitry.

Figure 1:
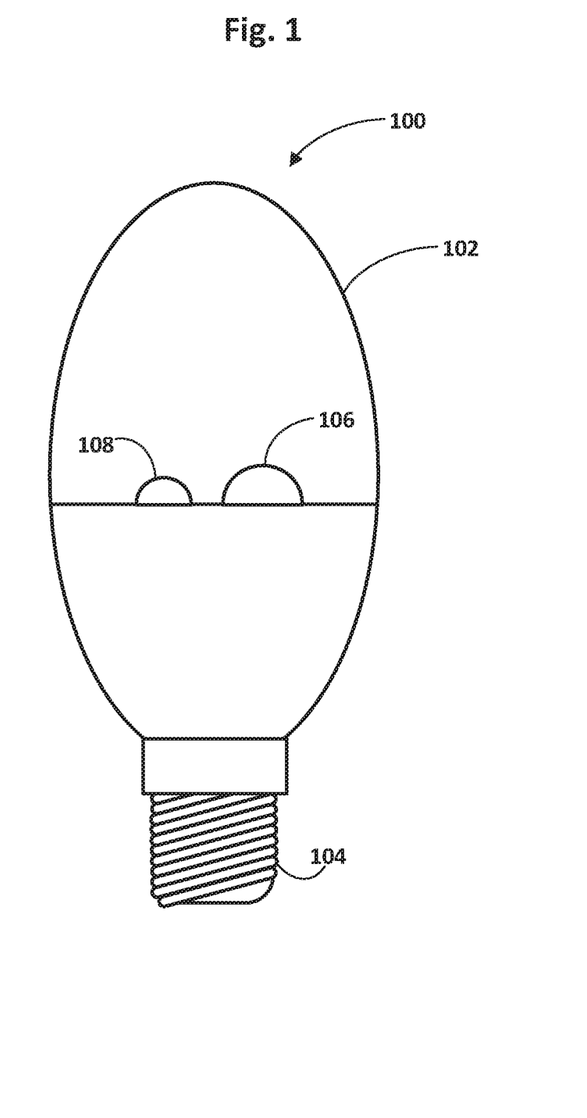
FIG. 1 illustrates an example lighting unit configured with selected aspects of the present disclosure, in accordance with various embodiments.

Referring to FIG. 1, in one embodiment, a lighting unit 100 may include a housing 102. Housing 102 may permit light to pass through in various directions and therefore may be partially or wholly transparent or translucent. Housing 102 may be constructed from various materials such as glass or plastic. In various embodiments, a connector 104 may be provided to enable lighting unit 100 to be inserted (e.g., screwed) into a lighting socket (not depicted), such as might be found on a luminaire such as a chandelier.

In various embodiments, housing 102 may contain a first light source 106 and a second light source 108. In some embodiments, first light source 106 and/or second light source 108 may be various types of light sources, such as LEDs, incandescent, halogen, fluorescent, and so forth. In some embodiments, first light source 106 may be bigger than and/or more powerful than second light source 108, although this is not required. In some embodiments, first light source 106 may be capable of emitting light having a level of a particular lighting property, such as brightness, hue, and/or saturation, that is higher than that which can be emitted by second light source 108, though this is not required.

In various embodiments, first light source 106 may be adjustable to emit first light having a lighting property that is within a range of levels for that lighting property. For instance, in some embodiments, first light source 106 may be dimmable such that it emits light having an amount of brightness that is related to (e.g., proportional to) an amount of power received by first light source 106 (or by a component that drives first light source 106). In other embodiments, first light source 106 may emit light having an amount of another lighting property, such as hue or saturation, that is related to (e.g., proportional to) an amount of power received by first light source 106 (or by a component that drives first light source 106).

In various embodiments, second light source 108 may be configured to automatically transition between a plurality of states in which the light source 108 emits second light at a plurality of levels of a particular lighting property (or particular levels of a plurality of lighting properties). The plurality of emitted levels may collectively form a dynamic effect. For example, second light source 108 may be configured to intermittently switch between various relatively low levels of brightness, e.g., at random intervals, to mimic the flickering of candle light. In some embodiments, second light source 108 may be configured to intermittently switch between various levels of other lighting properties, such as various hues and/or saturations, alone or in combination with brightness, to mimic water rippling, tree leaves blowing, clouds passing over the sun, a distant thunderstorm, and so forth.

Figure 2:
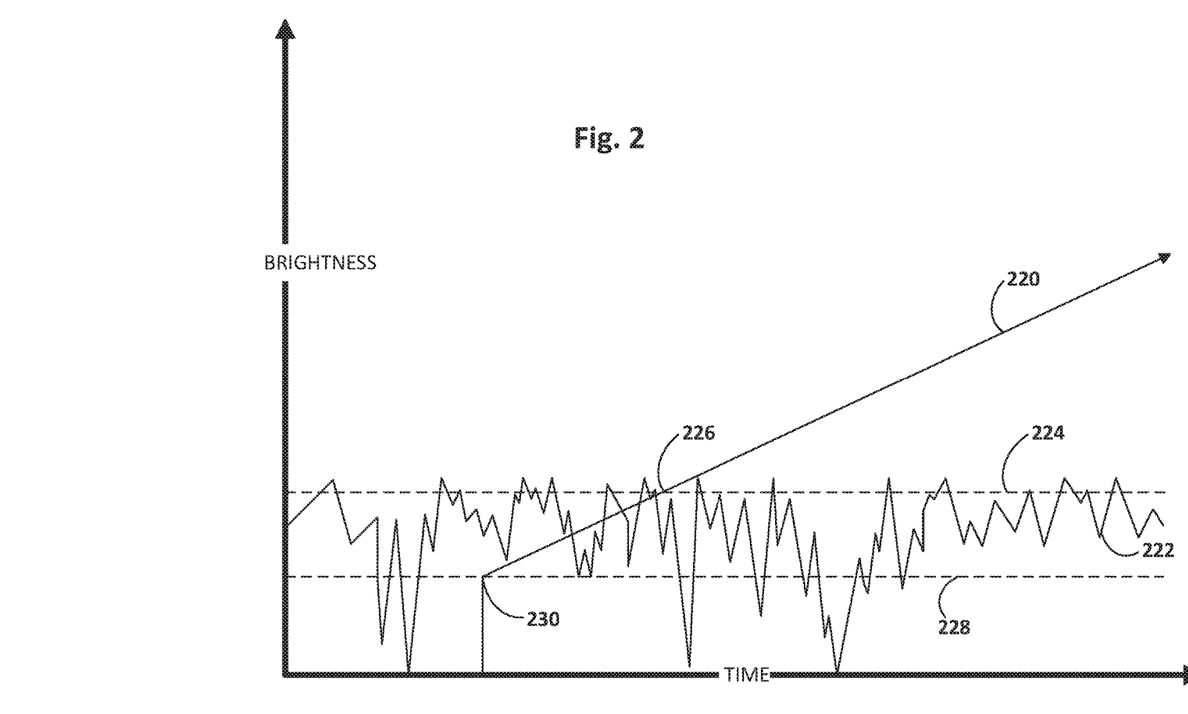
FIG. 2 depicts an example of how light emitted by two different light sources of a lighting unit may interplay.

In various embodiments, light emitted by second light source 108 may be visible only when light emitted by first light source 106 has a property that is at or below a particular level. For example, FIG. 2 depicts a chart with a horizontal axis that represents time, and a vertical axis that represents brightness emitted by both first light source 106 (the line indicated at 220) and second light source 108 (the line indicated at 222). In this example, power applied to first light source 106 is increased steadily over time to form the linear increase in brightness represented by line 220. This may occur where, for instance, a dimmer switch is steadily rotated clockwise to increase brightness of light emitted by first light source 106. If power applied to first light source 106 were increased at a faster or slower rate, then the line at 220 would be steeper or less steep, respectively. And of course, it is possible to increase/decrease power to first light source 106 in other ways so that brightness increases/decreases exponentially or otherwise, in which case line 220 could be curved.

As noted above, light emitted by second light source 108 may be modulated to emit light having a plurality of brightness levels. As seen in FIG. 2, light emitted by second light source 108 (as indicated by line 222) has a brightness that is also independent of brightness of light emitted by first light source 106. Those brightness levels may be selected, for instance, at random, e.g., to mimic the flicker of a candle. In other examples, those brightness levels may be selected, e.g., in combination with one or more hues, to mimic other phenomena, such as water rippling.

In some embodiments, second light source 108 may be selectively energized to emit light while first light source 106 is adjusted to emit light having a particular property below a particular level. In FIG. 2, for instance, line 224 represents a brightness threshold above which light emitted by second light source 108 is no longer visible, or at which the lighting effect emitted by second light source is no longer sufficiently distinct to be aesthetically appealing. Until line 220 (representing brightness of light emitted by first light source 106) intersects line 224 at point 226, at least some light emitted by second light source 108 (indicated by line 222) may be visible and/or the lighting effect emitted by second light source 108 may still be sufficiently distinct as to warrant continued emission. On the other hand, after line 220 (representing brightness of light emitted by first light source 106) intersects line 224 at point 226, light from second light source 108, represented by line 222, may no longer be visible or may be so indistinct as to no longer warrant emission continued emission.

In various embodiments, the threshold represented by line 224 may be selected automatically, e.g., using one or more light sensors, or manually, e.g., via configuration by an administrative user. In other embodiments, second light source 108 may simply continue to emit its dynamic lighting effect, despite the fact that the lighting effect may no longer be visible. This may facilitate simplification of the electronics required for such operation, which in turn may justify the cost of continuously operating second light source 108 even while its emitted light is invisible.

In some embodiments, first light source 106 may not emit light while dimmed below a particular brightness level, referred to herein as a "floor" brightness level and designated at line 228. This may save power when light emitted by first light source 106 is low enough that it is likely to be drowned out or hidden by light from second light source 108. It may also simplify and/or reduce cost of manufacturing, as electronic dimmers that dim to very low levels of particular lighting properties (e.g., brightness) tend to be complicated and/or expensive. In FIG. 2, for instance, until power supplied to first light source 106 is sufficient to energize first light source 106 to emit light having a brightness that meets or exceeds the floor brightness level (e.g., at point 230), first light source 106 may emit no light. In some embodiments, there may "floors" that correspond to other properties of emitted light, such as hue and/or saturation.

Figure 3:
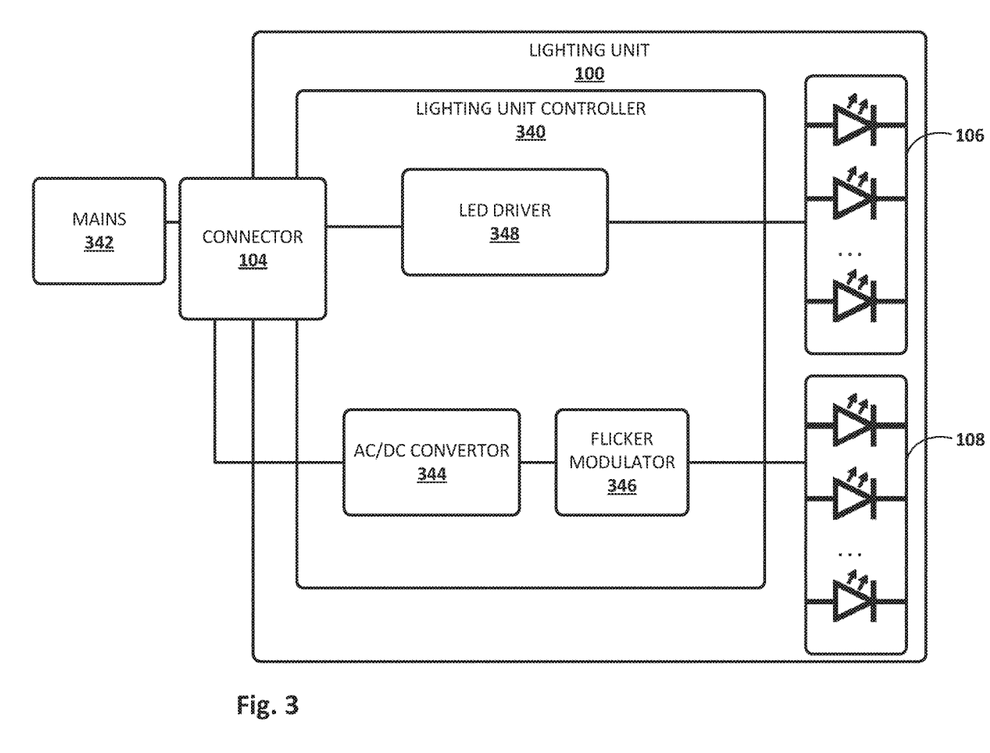
FIG. 3 schematically depicts components of a lighting unit configured with selected aspects of the present disclosure, in accordance with various embodiments.

FIG. 3 schematically depicts one example components of a lighting unit 100, in accordance with various embodiments. A lighting unit controller 340 may be operably coupled with one or more LEDs forming first light source 106 and one or more LEDs forming second light source 108. First and second light sources 106, 108 may be powered by a power source such as AC mains 342, to which lighting unit 100 may be connected, e.g., via connector 104.

In various embodiments, lighting unit controller 340 may include an AC/DC convertor 344 to convert AC power from AC mains 342 to a constant voltage for second light source 108. In some embodiments, a flicker modulator 346 may be provided between AC/DC convertor 344 and second light source 108 to automatically transition second light source 108 between one or more states in which it emits light having various levels of brightness. For example, the one or more states may include a fully energized state, a half energized state, or a not energized state or any state in between. In some embodiments, flicker modulator 346 may be an LED driver configured with logic (any combination of hardware and software) that causes the LED driver to alternate between providing various levels of power, or between providing power at various duty cycles (e.g., pulse width modulation), to second light source 108. Another LED driver 348 may be provided to control how first light source 106 is energized, e.g., in response to an amount of power received from AC mains 342. In various embodiments, flicker modulator 346 may operate independently of LED driver 348. For example, second light source 108 may continue to emit its dynamic effect regardless of what first light source 106 is doing.

In various embodiments, first and second light sources 106, 108 may be independently adjustable to alter various properties of light they emit, such as hue, saturation, color temperature, and so forth. A lighting control interface that may control lighting properties emitted by each light source may be implemented, for instance, on a mobile computing device such as a smart phone or tablet computer. For example, a lighting control interface may be rendered on a touch screen of a smart phone, or rendered in the glass of a pair of smart glasses. Additionally or alternatively, a lighting control interface may be implemented on, e.g., rendered on a touch screen of, a so-called "smart" light switch that replaces a "legacy" light switch and which includes controls that are operable to adjust various lighting properties of light emitted by light sources.

In various embodiments, a lighting control interface may facilitate control of both first source 106 and second light source 108 simultaneously, e.g., so that a change in hue of light emitted by one light source is also made to light emitted by the other. In some embodiments, a lighting control interface may facilitate independent control of first light source 106 and second light source 108, e.g., so that light they emit may have different hues/color temperatures/saturations/etc.

It might not always be justifiable to implement a requested change to light emitted by second light source 108. For example, while first light source 106 is emitting light at full power, light emitted by second light source 108 may not be visible. Accordingly, in some embodiments, second light source 108 may respond to a request (e.g., made using a lighting control interface) to emit a particular lighting property or lighting scene in different ways depending on a brightness level of light emitted by first light source 106.

Suppose a lighting control interface includes multiple lighting scene selection buttons that may be pressed to selectively cause implementation of various lighting scenes (e.g., romantic, reading, etc.). In some embodiments, those lighting scene selection buttons may cause different lighting scenes to be implemented by different light sources depending on the state of a dimmer switch that controls power supplied to first light source 106. For example, suppose the dimmer switch is turned all the way up, causing first light source 106 to be fully energized. In such case, operation of the lighting scene selection buttons may cause first light source 106 to implement, or contribute to implementation of, a particular lighting scene. Second light source 108 may be unaffected. However, suppose the dimmer switch is turned down sufficiently low, e.g., such that first light source 106 is not emitting light or the light it emits is not visible over light emitted by second light source 108. In that case, operation of the same lighting scene selection buttons may cause second light source 108 implement, or contribute to implementation of, a particular lighting scene. In one example, the determination based on the state of the dimmer switch may be made by a mobile computing device. In other examples, the determination may be made by lighting unit controller 340.

Figure 4:
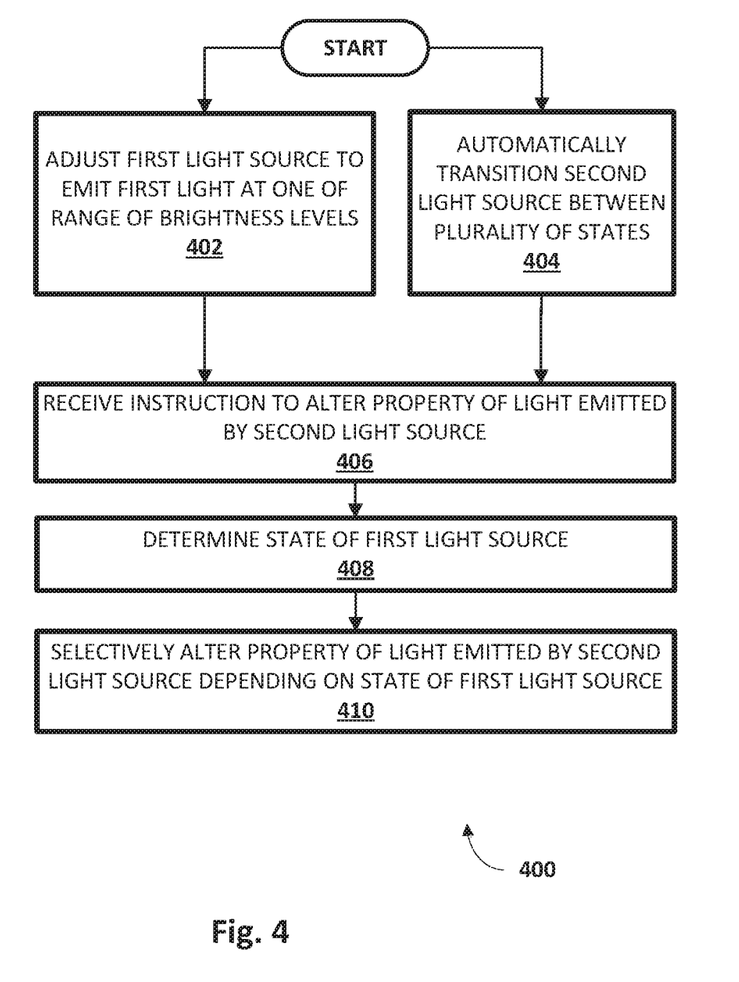
FIG. 4 depicts an example lighting control method, in accordance with various embodiments.

FIG. 4 depicts an example method 400 for controlling light output by a lighting unit (e.g., 100) configured with selected aspects of the present disclosure. At block 402, first light source 106 may be adjusted to emit first light at one of a range of brightness levels. For example, first light source 106 may be adjusted by a lighting unit controller (e.g., 340) or more specifically by an LED driver (e.g., 348). At block 404, which may occur concurrently with block 402, second light source 108 may be automatically transitioned between a plurality of states in which it emits a plurality of levels of a particular lighting property, such as brightness, saturation or hue. For example, second light source 108 may be automatically transitioned using lighting unit controller (e.g. 340) or more specifically by a flicker modulator (e.g., 346).

At block 406, an instruction may be received, e.g., from a mobile computing device in response to a user operating a lighting control interface, to alter a property of light emitted by second light source 108. At block 408, a state of first light source 106 may be determined. For example, the state may be determined using the lighting unit controller or using the mobile computing device and may include a fully energized state, a half energized state, or a not energized state. In other examples, other states between these discrete states may be determined. At block 410, in response to the instruction received at block 406, a property of light emitted by second light source 108 may be selectively altered depending on the state of first light source 106 determined at block 408. For example, if first light source 106 is fully energized, the requested lighting property alteration may be ignored at second light source 108 since it would not be visible.

Figure 5:
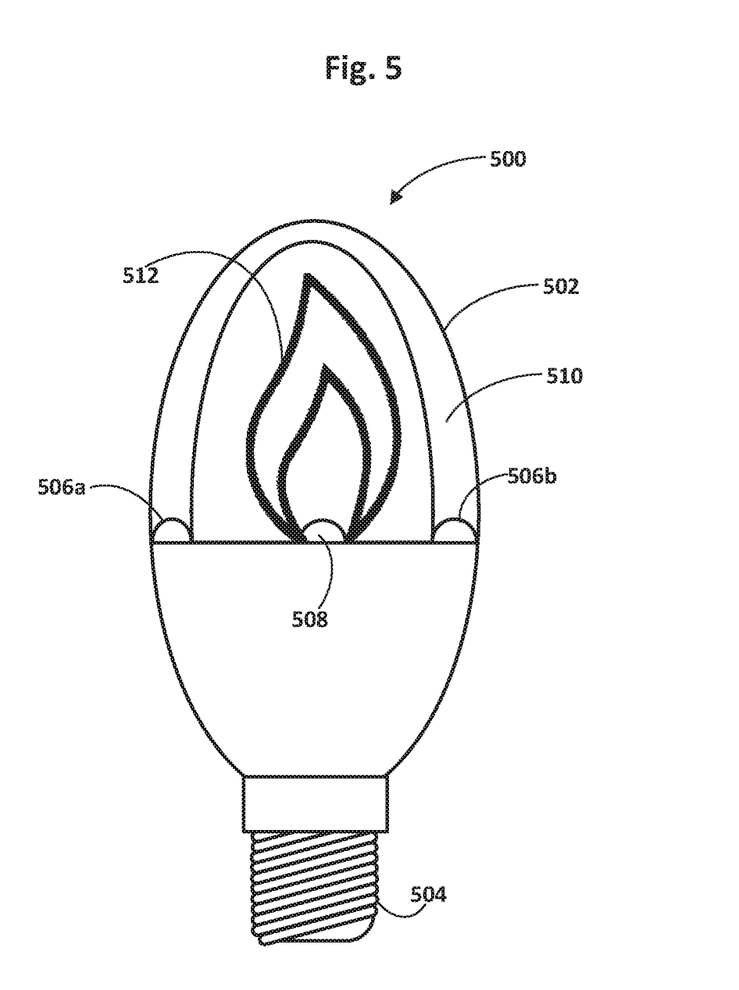
FIG. 5 illustrates another example lighting unit configured with selected aspects of the present disclosure, in accordance with various embodiments.

FIG. 5 depicts another example lighting unit 500 configured with selected aspects of the present disclosure. Lighting unit 500 includes many of the same components of lighting unit 100 in FIG. 1. For example, lighting unit 500 may include a housing 502 and a connector 504 that serve the same purposes of housing 102 and connector 104 of lighting unit 100. Similar to lighting unit 100, lighting unit 500 may include multiple light sources. However, in this instance, lighting unit 500 includes two first light sources 506a and 506b, both which may operate in the same fashion as first light source 106 described above. Lighting unit 500 may also include a second light source 508 that may be similar to second light source 108 described above (e.g., used to create a dynamic effect). Similarly, method 400 for controlling light output may control the light out by the lighting unit 500 configured with selected aspects of the present disclosure.

In FIG. 5, lighting unit 500 includes a first light guide 510 and a second light guide 512. In various embodiments, first light guide 510 may take the form of a thickened housing 502 through which light may pass. In some embodiments, first light sources 506a and 506b may be mounted on lighting unit 500 so that light they emit passes directly into guide 510, in addition to or instead of passing into an interior of housing 502. For example, first light guide may have a dome shape, and light emitted by first light sources 506a and 506b may be emitted along a wall of the dome shape so that the light is guided generally perpendicular to a surface of housing 502, rather than directly into (e.g., normal to) the surface of housing 502. In some embodiments, light emitted by first light sources 506a and 506b may diffuse somewhat evenly across the entirety of first light guide 510 (and more generally, housing 502). In some cases, when illuminated sufficiently by first light sources 506a and 506b, first light guide may partially or wholly mask light emitted by second light source 508. In various embodiments, second light guide 512 may take the form of a flame shaped piece of plastic, glass, or other similar materials, and may be at least partially or wholly transparent or translucent, and/or diffusive. In various embodiments, light emitted by second light source 508 may pass entirely, or at least in part, into second light guide 512, e.g., to assist in mimicking the flicker of a candle.

Figure 6:
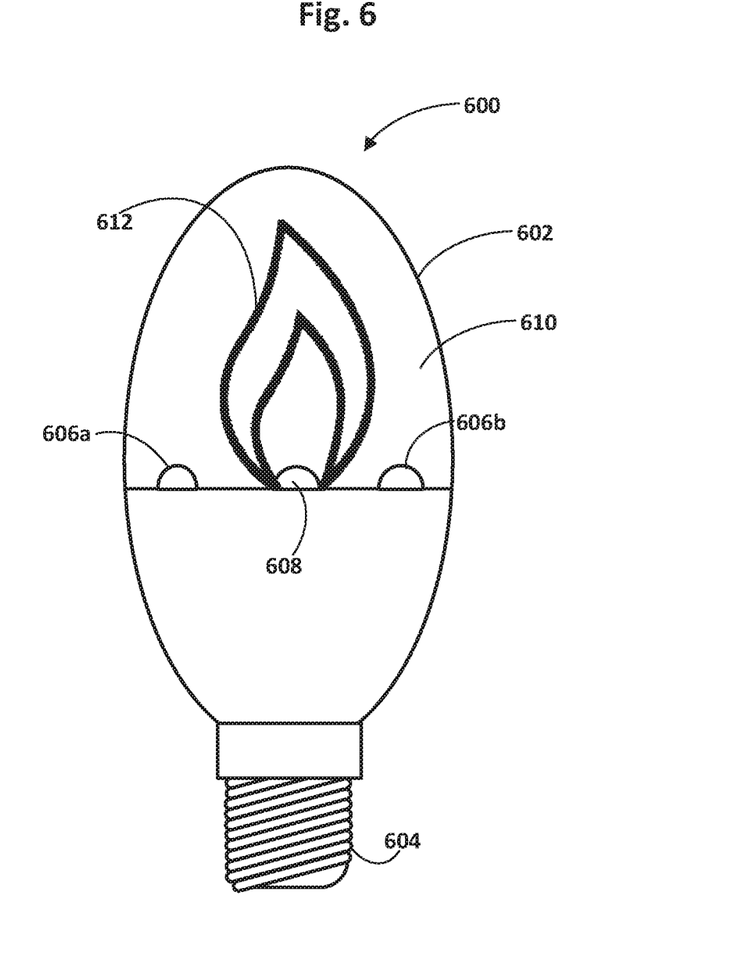
FIG. 6 illustrates another example lighting unit configured with selected aspects of the present disclosure, in accordance with various embodiments.

FIG. 6 depicts another lighting unit 600 configured with selected aspects of the present disclosure. Like lighting units 100 and 500, lighting unit 600 includes a housing 602 and a connector 604. Like lighting unit 500, lighting unit 600 includes multiple first light sources 606a and 606b that may, for instance, be dimmable, and a single second light source 608 for providing a dynamic effect independent of light provided by first light sources 606a and 606b. Unlike lighting unit 500, lighting unit 600 only includes a single light guide 612 that may be shaped, for instance, like a flame, for receiving light emitted by second light source 608. Light emitted by first light sources 606a and 606b may simply pass into an interior of housing 602. Similarly, method 400 for controlling light output may control the light out by the lighting unit 600 configured with selected aspects of the present disclosure.

Figure 7:
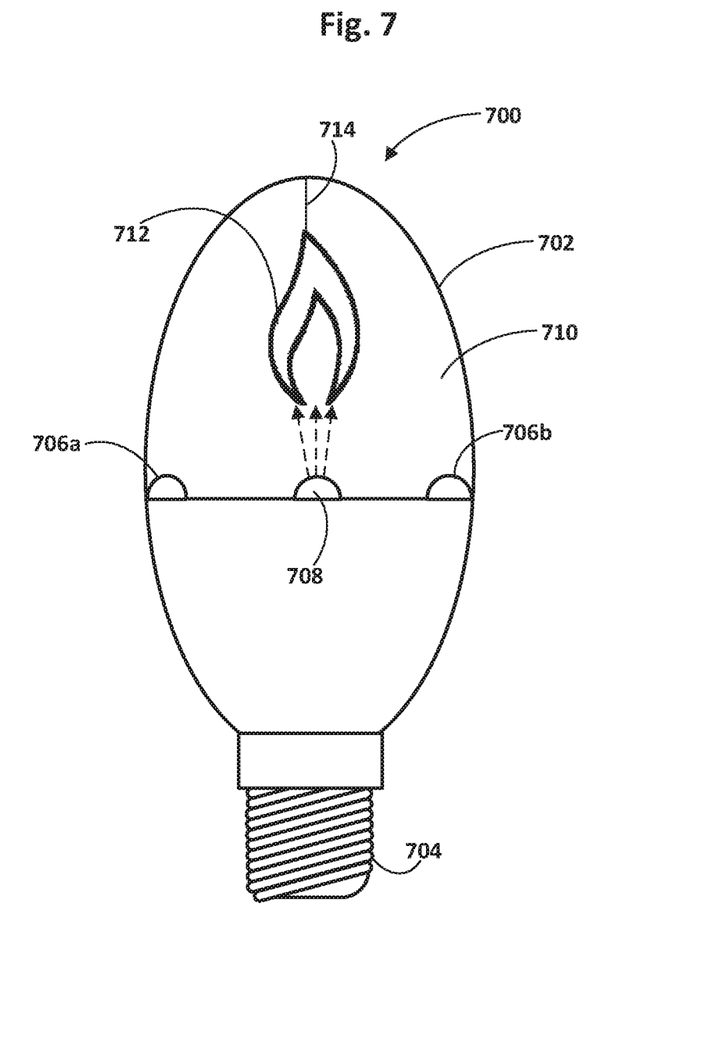
FIG. 7 illustrates another example lighting unit configured with selected aspects of the present disclosure, in accordance with various embodiments.

FIG. 7 depicts a lighting unit 700 that is a slight variation of lighting unit 600. Most components are the same and thus numbered similarly. However, light guide 712 not mounted near connector 704. Instead, light guide 712 is secured to an interior of housing 702, e.g., using one or more mechanical connections 714. The one or more mechanical connections 714 may come in various forms, such as a piece of string, a wire, a glass rod, etc. In various embodiments, light emitted by second light source 708 (i.e., the dynamic effect) may pass at least partially into the suspended light guide 712. It should be noted that in the embodiments of FIGS. 6 and 7, a second light guide similar to first light guide 710 could be incorporated without departing from the present disclosure. Similarly, method 400 for controlling light output may control the light out by the lighting unit 700 configured with selected aspects of the present disclosure.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting unit comprising:
   a housing;
   a first light source contained within the housing that is adjustable to emit first light at a range of brightness levels;
   a second light source contained within the housing; and
   a flicker modulator to automatically transition second light source between a plurality of states in which the second light source emits second light at a plurality of brightness levels that collectively form a dynamic effect,
   wherein the flicker modulator transitions the second light source between the plurality of states independently of how the first light source is adjusted,
   wherein the housing forms a dome-shaped light guide, and at least some of the first light is emitted along a wall of the dome-shaped light guide to be guided generally perpendicular to a surface of the housing,
   wherein the first light source is dimmable, and
   wherein the first light source stops emitting the first light in response to being dimmed below a floor brightness level.

2. The lighting unit of claim 1, wherein the first light source and the second light source includes one or more light-emitting diodes.

3. The lighting unit of claim 1, wherein the plurality of states comprise at least one of a fully energized state, a half energized state, and a not energized state.

4. The lighting unit of claim 1, wherein the first and second light sources are powered by an AC power source, and the lighting unit further comprises an AC/DC convertor to convert AC power from the AC power source to a constant voltage for the flicker modulator.

5. The lighting unit of claim 1, wherein the first and second light sources are independently adjustable to alter a hue, saturation or color temperature of the first and second lights, respectively.

6. A lighting unit comprising:
   a housing;
   a first light source contained within the housing that is adjustable to emit first light at a range of brightness levels;
   a second light source contained within the housing; and
   a flicker modulator to automatically transition second light source between a plurality of states in which the second light source emits second light at a plurality of brightness levels that collectively form a dynamic effect, wherein the flicker modulator transitions the second light source between the plurality of states independently of how the first light source is adjusted, wherein the housing forms a dome-shaped light guide, and at least some of the first light is emitted along a wall of the dome-shaped light guide to be guided generally perpendicular to a surface of the housing, and wherein the second light source responds to a request from a control lighting interface comprising lighting scene selection buttons to emit a particular lighting scene in different ways depending on a brightness level of the first light.

7. A lighting control method, comprising:

adjusting a first light source of a lighting unit to emit first light at one of a range of brightness levels; and automatically transitioning a second light source of the lighting unit between a plurality of states in which the second light source emits second light at a plurality of brightness levels that collectively form a dynamic effect;

wherein the second light is visible while the first light source is adjusted to emit light below a particular brightness level; and wherein the second light is invisible while the first light source is adjusted to emit light above the particular brightness level, the lighting control method further comprising:

receiving a request from a control lighting interface comprising lighting scene selection buttons to emit a particular lighting scene;

energizing the second light source to emit light having a first property when the first light has a first level of brightness; and energizing the second light source to emit light having a first property when the first light has a first level of brightness; and energizing the second light source to emit light having a second property that is different than the first property when the first light has a second level of brightness.

* * * * *